United States Patent
Bartel et al.

(10) Patent No.: US 11,479,665 B2
(45) Date of Patent: Oct. 25, 2022

(54) SILICA AND SILICATE BLENDED FIBER POLYMER COMPOSITE

(71) Applicant: Tundra Composites, LLC, White Bear Lake, MN (US)

(72) Inventors: Adam Bartel, St. Paul, MN (US); Scott Bohnen, Stillwater, MN (US); Kurt Heikkila, Marine on the Saint Croix, MN (US)

(73) Assignee: Tundra Composites, LLC, White Bear Lake, MN (US)

( * ) Notice: Subject to any disclaimer, the term of this patent is extended or adjusted under 35 U.S.C. 154(b) by 505 days.

(21) Appl. No.: 16/547,888

(22) Filed: Aug. 22, 2019

(65) Prior Publication Data

US 2021/0054184 A1   Feb. 25, 2021

(51) Int. Cl.
| | |
|---|---|
| C08L 27/06 | (2006.01) |
| C08K 7/08 | (2006.01) |
| C08K 7/10 | (2006.01) |
| C08K 7/14 | (2006.01) |
| C08K 9/04 | (2006.01) |
| C08J 3/12 | (2006.01) |
| C08J 3/22 | (2006.01) |
| C08J 5/04 | (2006.01) |
| C08J 5/06 | (2006.01) |
| C08K 3/013 | (2018.01) |

(52) U.S. Cl.
CPC .............. *C08L 27/06* (2013.01); *C08J 3/12* (2013.01); *C08J 3/226* (2013.01); *C08J 5/043* (2013.01); *C08J 5/0405* (2021.05); *C08J 5/047* (2013.01); *C08J 5/06* (2013.01); *C08K 3/013* (2018.01); *C08K 7/08* (2013.01); *C08K 7/10* (2013.01); *C08K 7/14* (2013.01); *C08K 9/04* (2013.01); *C08J 2327/06* (2013.01); *C08K 2201/003* (2013.01); *C08K 2201/004* (2013.01); *C08K 2201/016* (2013.01); *C08L 2207/04* (2013.01); *C08L 2310/00* (2013.01)

(58) Field of Classification Search
CPC .. C08L 27/06; C08L 2207/04; C08L 2310/00; C08K 3/013; C08K 7/08; C08K 7/10; C08K 7/14; C08K 9/04; C08K 2201/003; C08K 2201/004; C08K 2201/016; C08J 5/0405; C08J 5/047; C08J 5/06; C08J 3/12; C08J 3/26; C08J 2327/06
See application file for complete search history.

(56) References Cited

U.S. PATENT DOCUMENTS 10,414,886 B2 *  9/2019  Heikkila ............... C08K 7/02
11,186,693 B2 * 11/2021  Heikkila ............... C08J 5/08

* cited by examiner

*Primary Examiner* — Edward J Cain

(74) *Attorney, Agent, or Firm* — Mark J. DiPietro; Fred C. Morgan

(57) ABSTRACT

The claimed material relates to a mixed silica and silicate fiber and polymer composite having enhanced modulus, viscoelastic and rheological properties.

21 Claims, 2 Drawing Sheets

SILICA AND SILICATE BLENDED FIBER POLYMER COMPOSITE

FIELD

Disclosed is a composite of a silica fiber, a silicate fiber and a polymer. The composite has improved processing characteristics, improved structural product properties that produce enhanced products. The novel properties are produced in the composite by novel interactions of the fiber components and polymer components.

BACKGROUND

Blended materials have been made for many years by combining generally two or more dis-similar materials to obtain beneficial properties from the combination. In a true composite, the interactions of the component materials provide the best properties and characteristics of both components. The use of a reinforcing fiber produces a range of materials and, under the correct conditions, can form a true polymer composite. In contrast, a simple filled polymer, following the rule of mixtures, with additive or filler, displays properties that are simply expected based on the nature of the materials. Fillers are often used as simple replacements for an expensive component to reduce costs in the composition. Strongly coupled materials, such as polymer to fiber or fiber to fiber, have minimal viscoelastic properties.

Substantial attention has been paid to the creation of composite materials with unique properties. Fiber and fabric reinforced polymer materials can include cellulosic fiber, high modulus polyolefin fiber, polybenzoxazole fiber, carbon fiber, aramid fiber, boron fiber, glass fiber and hybrid materials. The fiber can be used in reinforcing thermoplastics and thermosets. Epoxy and polyurethane thermosets are common. Polyolefin, polyvinyl chloride (PVC) and other thermoplastics and hybrids have been developed for a variety of end uses.

Developing thermoplastic composite materials have faced difficult barriers. To obtain significant thermal processing, tensile, modulus, impact and coefficient of thermal expansion (COTE) properties, a composite must control the degree of interaction between reinforcing fiber and polymer and the degree of fiber loading in the polymer matrix. Highly filled composite polymer materials, greater than 40 vol. %, cannot be easily made. Melt processing thermoplastics and fibers are not easily combined due to differences in the polymer with respect to fiber character such as uncoated fiber composition, density, surface energy, roughness and morphology. Excessive compounding processing that is needed to obtain a uniform composite can cause fiber damage and thermal depolymerization of the polymer with accompanying hazards of fire and toxic gasses. While fiber composites have been proposed with high fiber loadings, commercially, due to process limitations, products have typically achieved about 40 to 50 vol. % fiber.

While a substantial amount of work has been done regarding fiber reinforced thermoplastic polymer composite materials. A substantial need exists for a composite material that has a dispersed phase surface that is made more compatible and inert with respect to the polymer, improved fiber packing efficiency and with high fiber content, improved thermal compounding processing that maintains fiber integrity with improved rheology, and produce composites with improved structural properties at elevated use temperatures.

BRIEF DESCRIPTION

A composite of an interfacial modifier (IM) coated silica and a silicate fiber and a polymer has improved and novel properties. The claimed composite is made of a combination of a thermoplastic polymer and combination of an interfacial modified silica and silicate fiber. The composite can be made of about 10 to 90 wt. % of a continuous phase comprising the polymer with about 90 to 10 wt. % of a discontinuous phase comprising the fiber. The composite properties result from a selection of fiber composition, length, diameter and aspect ratio, polymer type, molecular weight, viscoelastic character and processing conditions. The resulting composite materials exceed the contemporary structural composites in at least one property such as packing, surface inertness, processability, COTE, tensile properties modulus and physical modulus. In the process of making the composite, the fiber input to the compounding process unit can have an arbitrary length, often about 0.8 to 100 mm. The product output of the compounding process unit can have a fiber of similar length, depending on process conditions. The fiber can be reduced in length if sheared in compounding. The composite containing the fiber can be pelletized. In the pellet, the fiber cannot be longer than the major dimension of the pellet. The pellet can be formed into a product with melt processing techniques.

One aspect of the claimed material is a composite of interfacially modified coated silica/silicate blended fiber and polymer. One or both of the fibers can be densified. Such a composite material is a thermoplastic in character and can be extruded and then melted and reextruded.

Another aspect is a structural member made of the composite. Such structural members can be used in commercial and residential construction and can include decking, siding and fenestration units including trim, windows and doors.

Still another aspect is a pellet made of the composite that can be used as an intermediate article between the compounding of the composite and the manufacturing of the final product. Such a pellet can comprise the composite comprising the components designed to be directly used in making an article. Alternatively, the pellet can comprise a master batch composition with increased amounts of fiber such that the pellet can be combined with added polymer in proportions that result in producing use concentrations.

A final aspect of the claimed material is a method of compounding the composite by compounding the combined polymer resin and interfacial modified silica/silicate blended fiber under conditions.

As used in this disclosure the term "a fiber" means a collection of similar fibers in a fibrous material combined with a polymer as input to a compounding process unit. Fiber as used in a discontinuous phase can be free of a particle or particulate.

Particle, or a collection of particles known as a particulate, is a discrete object having a particle size about 0.1-500 microns, an aspect ratio of less than 3 and a circularity ((circularity, is measured by a view of the two-dimensional projection of a particle, and is equal to (perimeter)$^2$/area)) is less than 20.

As used in this disclosure the term "continuous phase" means the polymer matrix into which the fiber is dispersed during compounding.

As used in this disclosure the term "discontinuous phase" means the individual fibers that are dispersed throughout the continuous phase.

As used in this disclosure, silica is not a silicate. Silica typically comprised most of individual species as $SiO_2$. A silicate typically comprised most of individual anionic species as a salt of a charged species as silicate such as $SiO_3^{+2}$ or $SiO_4^{+4}$ or other charged similar silicate species.

As used in this disclosure the term "interfacial modifier" (IM) means a material that can coat the surface of fiber and does not react or interact with the polymer or other coated fiber present in the composite. In one embodiment, the IM is an organo-metallic material.

As used in this disclosure the term "densified" when used as a composite fiber material characteristic means a fiber source that is processed to increase the bulk density of the material such that is approaches the density of the polymer used in the composite. A silicate fiber that is naturally about 0.2 to 0.4 g-cc$^{-3}$ density is processed to be at least 0.4 g-cc$^{-3}$ or to 5 g-cc$^{-3}$ or more.

DETAILED DISCUSSION

Figure 1:
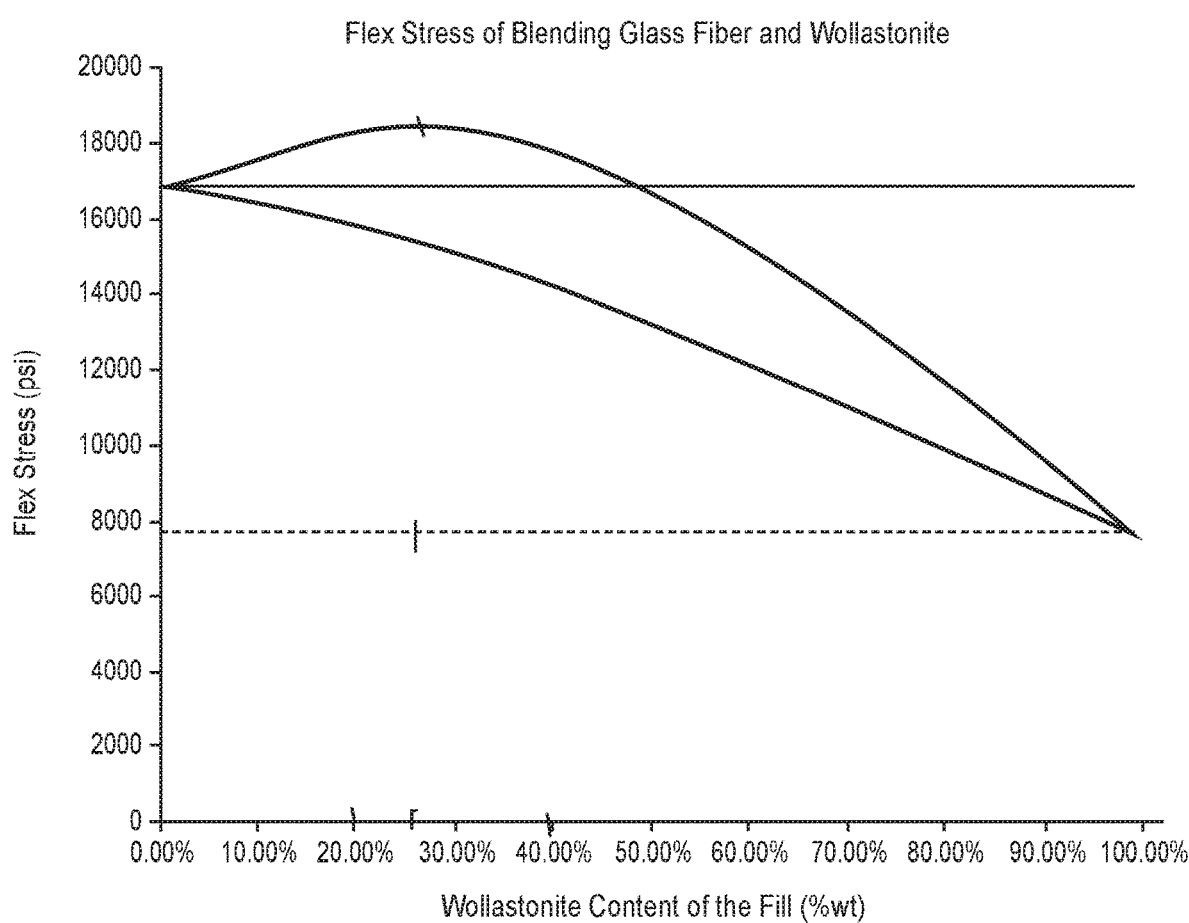
FIGS. 1 and 2 show the range of materials tested and the test results of the tested materials of IM coated glass fibers and IM coated wollastonite fibers in flex and notched IZOD impact strength.

Novel composites are made by combining an interfacial modified fiber blend and a polymer to achieve novel physical and process properties. The fiber comprises a silica fiber and a silicate or meta silicate fiber.

The composite can be made of about 10 to 90 wt. % of a continuous phase comprising the polymer with about 5 to 95 wt. % or about 90 to 10 wt. % of a discontinuous s phase comprising the glass fiber/calcium silicate fiber blend. The fiber blend comprises about 8 to 50 wt. % of a calcium silicate fiber. While silicate chemistry is often complex, with varied propositions and crystal forms of a reaction product of metal oxide and silica. For example, calcium silicate can be expressed as $CaSiO_3$ $Ca_2SiO_4$ or $2CaO \cdot SiO_2$. A useful silicate fiber is wollastonite, a natural $CaSiO_3$ fiber containing small amounts of iron, magnesium and manganese.

The fiber can comprise a metal (e.g., calcium or magnesium) silicate or meta silicate fiber through a reaction of a metal oxide with silica. While silicate chemistry is often complex, with varied propositions and crystal forms of metal oxide and silica. For example, calcium silicate can be expressed as $CaSiO_3$, $Ca_2SiO_4$ or $2CaO \cdot SiO_2$. A useful silicate fiber is wollastonite, a unique natural silicate (Ca-$SiO_3$) fiber containing small amounts of iron, magnesium and manganese. One aspect of the mineral can be represented as compositions including $CaSiO_3$—$MgSiO_3$—$FeSiO_3$ with the iron and magnesium components in minor proportions. Wollastonite is a crystalline fiber with chains of linked negatively charged $SiO_4$ tetrahedra.

Wollastonite is commonly used in ceramics, tiles, paints compositions. Wollastonite has been proposed as a substitute for asbestos in a variety of products but its unique inorganic nature has limited its applicability in thermoplastic composites. The morphology, roughness, surface energy and hydrophobic nature of the wollastonite fiber's uncoated surface severely limits commercial manufacture due to resulting poor melt polymer mixing, minimal packing and nonuniform composites. The use of a densified material can increase the process characteristics of the material and obtain improved product uniformity and physical properties. Without a uniform composite, the compounding processing and resulting mechanical properties can be lacking. Each of the individual fibers of the generic, useful fiber material has a cross-section dimension (preferably but not limited to a diameter) of at least about 0.8 micron often about 1-150 microns and can be 2-100 microns, or 5 to 10 microns, a length of 0.1-150 mm, often 0.2-100 mm, and often 50 to 100 mm and can have an aspect ratio of at least 50 often about 100-1500. These aspect ratios are typical of the input into the compounder. After pellets are formed the aspect ratio is limited by the pellet dimensions.

A useful fiber is a wollastonite fiber as follows:

| Typical Properties: | VANSIL WG | VANSIL HR-2000 | VANSIL HR-1500 |
|---|---|---|---|
| Density | 21.7 lbs.-gal$^{-1}$ 2.9 g-cc$^{-1}$ | 21.7 lbs.-gal$^{-1}$ 2.9 g-cc$^{-1}$ | 21.7 lbs.-gal$^{-1}$ 2.9 g-cc$^{-1}$ |
| pH, 10% slurry (ASTM D 1208) | 10-11 | 10-11 | 10-11 |
| G.E. Brightness (TAPPI T-646) | 86-88 | 93-95 | 93-95 |
| Bulk Density (loose) | 31 lbs.-ft$^{-3}$ | 25 lbs.-ft$^{-3}$ | 24 lbs.-ft$^{-3}$ |
| Bulk Density (tapped) | 45 lbs.-ft$^{-3}$ | 39 lbs.-ft$^{-3}$ | 37 lbs.-ft$^{-3}$ |
| Average Aspect Ratio | 15:1 | 12:1 | 14:1 |
| Average Needle Length | 90 μm | 65 μm | 60 μm |
| Average Needle Width | 9 μm | 7 μm | 5 μm |
| Particle Size (Horiba LA-300): | | | |
| D10 | 4 μm | 4 μm | 3 μm |
| D50 | 28 μm | 17 μm | 13 μm |
| D90 | 117 μm | 65 μm | 50 μm |
| D95 | 146 μm | 88 μm | 68 μm |
| Wet Screen Analysis: | | | |
| Plus 100 mesh | <2% | 0.1% | <0.1% |
| Plus 200 mesh | 15-20% | <3% | <1% |
| Plus 325 mesh | 30-35% | <20% | 5-7% |

The mineral can be represented as compositions including $CaSiO_3$—$MgSiO_3$—$FeSiO_3$ with the iron and magnesium components in minor proportions. Wollastonite is a crystalline fiber with chains of bonded $SiO_4$ tetrahedra. Wollastonite is commonly used in ceramics, tiles, paints compositions. Wollastonite has been proposed as a substitute for asbestos in a variety of products but its unique inorganic nature has limited its applicability in thermoplastic composites. The surface energy and hydrophobic nature of the wollastonite fiber surface severely limits commercial manufacture due to resulting poor melt polymer mixing, minimal packing and nonuniform composites. The use of a densified material can increase the process characteristics of the material and obtain improved product uniformity and physical properties. Without a uniform composite, the compounding processing and resulting mechanical properties can be lacking.

Each of the individual fibers of the generic, useful fiber material has a cross-section dimension (preferably but not limited to a diameter) of at least about 0.8 micron often about 1-150 microns and can be 2-100 microns, or 5 to 10 microns, a length of 0.1-150 mm, often 0.2-100 mm, and often 50 to 100 mm and can have an aspect ratio of at least 90 often about 100-1500. After pellets are formed the aspect ratio is set by the pellet dimensions. In certain circumstances, a silicate material can be used that has an aspect ratio of less than 3 and a circularity of greater than 20, often 25-100 or 30 to 100. In this embodiment, the non-circular rough or ragged morphology provides the reinforcement in combination with the fiber. More circular materials provide little reinforcements. The more the material departs from the near circular and obtains an irregular morphology, the more reinforcement is obtained in the resulting composite.

Silica forms another useful fiber and comprises a glass fiber known by the designations: A, C, D, E, Zero Boron E, ECR, AR, R, S, S-2, N, and the like. Generally, any glass that can be made into fibers either by drawing processes used for making reinforcement fibers or spinning processes used for making thermal insulation fibers. Such fiber is typically used as a length of about 0.8-100 microns often about 2-100 microns, a diameter about 0.8-100 microns and an aspect ratio (length divided by diameter) greater than 90 or about 100 to 1500. These commercially available fibers are often combined with a sizing coating. Such coatings cause the otherwise ionically neutral glass fibers to form and remain in bundles or fiber aggregates. Sizing coatings are applied during manufacture before gathering. The sizing minimizes filament degradation caused by filament to filament abrasion. Sizings can be lubricants, protective, or reactive coupling agents but do not contribute to the properties of a composite using an interfacial modifier (IM) coating on the fiber surface. Sizings are not Interfacial modifiers. Useful volume % of the fiber phase in the claimed composite can be adjusted to above 40, 50, 60, 70, 80, or 90%, depending on the end use of the article or structural member and the required physical properties of the article or structural member, without loss of processability via melt-processing, viscoelasticity, rheology, high packing fraction, and fiber surface inertness of the composite.

A composite is more than a simple admixture with properties that can be predicted by the rule of mixtures. A composite is defined as a combination of two or more substances at various percentages, in which each component results in properties of the composite material that are in addition to or superior to those of its constituents. In a simple admixture, the mixed material has little interaction and little property enhancement. In a composite material, at least one of the materials can be chosen to increase stiffness, strength or density.

The atoms and molecules in the components of the composite can form bonds with other atoms or molecules using several mechanisms. Such bonding can occur between the electron cloud of an atom or molecular surfaces including molecular-molecular interactions, atom-molecular interactions and atom-atom interactions. Each bonding mechanism involves characteristic forces and dimensions between the atomic centers even in molecular interactions. The important aspect of such bonding force is strength and the variation of bonding strength over distance and directionality. The major forces in such bonding include ionic bonding, covalent bonding and the van der Waals' (VDW) types of bonding. We seek to avoid covalent bonding and minimize or control VDW bonding.

Ionic radii and bonding occur in ionic species such as $Na^+Cl^-$, $Li^+F^-$. Such ionic species form ionic bonds between the atomic centers. Such bonding is substantial, often substantially greater than 100 $kJ\cdot mol^{-1}$ often greater than 250 $kJ\cdot mol^{-1}$. Further, the interatomic distance for ionic radii tend to be small and on the order of 1-3 Å.

Covalent bonding results from the overlap of electron clouds surrounding atoms forming a direct covalent bond between atomic centers. The covalent bond strengths are substantial, are roughly equivalent to ionic bonding and tend to have somewhat smaller interatomic distances.

The varied types of van der Waals' forces are different than covalent and ionic bonding. These van der Waals' forces tend to be forces between molecules, not between atomic centers. In the composites of the claimed materials strong covalent or ionic bonding is avoided. Reactive coupling agents that bond polymer to fiber are not used. The blended fiber polymer composite as shown in the embodiments is formed with van der Waals bonding as modified by the IM coating.

Bonding strength less than covalent, ionic or hydrogen bonding arise by the separation of charges on a molecule creating a generally or partially positive end and a generally or partially negative opposite end. The forces arise from electrostatic interaction between the molecule's negative and positive regions. Hydrogen bonding is a dipole-dipole interaction between a hydrogen atom and an electronegative region in a molecule, typically comprising oxygen, fluorine, nitrogen or other relatively electronegative (compared to H) site. These atoms attain a dipole negative charge attracting a dipole-dipole interaction with a hydrogen atom having a positive charge.

The van der Waals' force existing between substantially non-polar uncharged molecules occurs in non-polar molecules, the force arises from the movement of electrons within the molecule. Because of the rapidity of motion within the electron cloud, the non-polar molecule attains a small but meaningful instantaneous charge as electron movement causes a temporary change in the polarization of the molecule. These minor fluctuations in charge result in the dispersion portion of the van der Waals' force.

Such VDW forces, because of the nature of the fluctuating polarization of the molecule, tend to be low in bond strength, typically 50 kJ $mol^{-1}$ or less. Further, the range at which the force becomes attractive is also substantially greater than ionic or covalent bonding and tends to be about 3-10 Å.

In the interfacial modifier (IM) modified van der Waals composite materials, we have found that the unique combination of fiber, the varying but controlled size and aspect ratio of the fiber component, the modification of the interaction between the fiber and the polymer, result in the creation of a unique van der Waals' bonding. The van der Waals' forces arise between molecules/aggregates/crystals and are created by the combination of fiber size, polymer and interfacial modifiers in the composite.

In the past, materials have been made as mere mixtures of components or as covalently coupled components. While these are often characterized, as "composite", they are stiff inextensible materials or merely comprised a polymer filled with particulate with little or no van der Waals' interaction between the particulate filler material. In sharp contrast to the previous materials, the interaction between the selection of fiber size distribution and interfacially modified fiber enables the fiber to achieve an intermolecular distance that creates a substantial van der Waals' bonding.

The reference materials having little viscoelastic properties, do not achieve a true composite structure as now described. This leads us to conclude that this intermolecular distance is not attained in the reference materials. In the discussion above, the term "molecule" can be used to relate to a fiber, a fiber comprising non-metal crystal or an amorphous aggregate, other molecular or atomic units or subunits of non-metal or inorganic mixtures. The van der Waals' forces occur between collections of metal atoms, embodiments of the interfacial modifier, that act as "molecules".

Both fiber types of the fiber blend, such silicate and silica, are typically coated with an interfacial surface chemical treatment also called an interfacial modifier (IM) that supports or enhances the final properties of the composite such as viscoelasticity, rheology, high packing fraction, and fiber surface inertness. These properties are not present in contemporary composite materials. The fibers can be coated separately, or the fibers can be combined and then coated in batch with the interfacial modifier. An interfacially modified fiber has a substantially complete coating of an interfacial modifier (IM) with a thickness of less than 1500 Angstroms often less than 200 Angstroms, and commonly 10 to 500 Angstroms (Å) or 100 to 1500 Angstroms (Å).

An interfacial modifier can be an organo-metallic material that provides an exterior coating on the fiber promoting the close association, but not attachment or bonding, of polymer to fiber and fiber to fiber. The composite properties arise from the intimate association of the polymer and fiber obtained by use of careful processing and manufacture. An interfacial modifier is an organic material, in some examples an organo-metallic material, that provides an exterior coating on the fiber to provide a surface that can associate with the polymer promoting the close association of polymer and fiber but with no reactive bonding, such as covalent bonding for example, of polymer to fiber, fiber to fiber, or fiber to a different particulate, such as a glass fiber or a glass bubble. The lack of reactive bonding between the components of the composite leads to the formation of the novel composite— such as high packing fraction, commercially useful rheology, viscoelastic properties, and surface inertness of the fiber. These characteristics can be readily observed when the composite with interfacially modified coated fiber is compared to fiber lacking the interfacial modifier coating or to fiber that is reactively coupled to other fiber or polymer. In one embodiment, the coating of interfacial modifier at least partially covers the surface of the fiber. In another embodiment, the coating of interfacial modifier continuously and uniformly covers the surface of the fiber, in a continuous coating phase layer.

Interfacial modifiers used in the application fall into broad categories including, for example, titanate compounds, zirconate compounds, hafnium compounds, samarium compounds, strontium compounds, neodymium compounds, yttrium compounds, phosphonate compounds, aluminate compounds and zinc compounds. Aluminates, phosphonates, titanates and zirconates that are useful contain from about 1 to about 3 ligands comprising hydrocarbyl phosphate esters and/or hydrocarbyl sulfonate esters and about 1 to 3 hydrocarbyl ligands which may further contain unsaturation and heteroatoms such as oxygen, nitrogen and sulfur.

In one embodiment, the interfacial modifier that can be used is a type of organo-metallic material such as organo-cobalt, organo-iron, organo-nickel, organo-titanate, organo-aluminate organo-strontium, organo-neodymium, organo-yttrium, organo-zinc or organo-zirconate. The specific type of organo-titanate, organo-aluminates, organo-strontium, organo-neodymium, organo-yttrium, organo-zirconates which can be used, and which can be referred to as organo-metallic compounds are distinguished by the presence of at least one hydrolysable group and at least one organic moiety. Mixtures of the organo-metallic materials may be used. The mixture of the interfacial modifiers may be applied inter- or intra-fiber, which means at least one fiber may have more than one interfacial modifier coating the surface (intra), or more than one interfacial modifier coating may be applied to different fibers or fiber size distributions (inter).

Certain of these types of compounds may be defined by the following general formula:

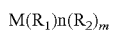

$$M(R_1)n(R_2)_m$$

wherein M is a central atom selected from such metals as, for example, Ti, Al, and Zr and other metal centers; $R_1$ is a hydrolysable group; $R_2$ is a group consisting of an organic moiety, preferably an organic group that is non-reactive with polymer or other film former; wherein the sum of m+n must equal the coordination number of the central atom and where n is an integer $\geq 1$ and m is an integer $\geq 1$. Particularly $R_1$ is an alkoxy group having less than 12 carbon atoms. Other useful groups are those alkoxy groups, which have less than 6 carbons, and alkoxy groups having 1-3 C atoms. $R_2$ is an organic group including between 6-30, preferably 10-24 carbon atoms optionally including one or more hetero atoms selected from the group consisting of N, O, S and P. $R_2$ is a group consisting of an organic moiety, which is not easily hydrolyzed and is often lipophilic and can be a chain of an alkyl, ether, ester, phospho-alkyl, phospho-alkyl, phospho-lipid, or phospho-amine. The phosphorus may be present as phosphate, pyrophosphato, or phosphito groups. Furthermore, $R_2$ may be linear, branched, cyclic, or aromatic. $R_2$ is substantially unreactive, i.e. not providing attachment or bonding, to other particles or fiber within the composite material. Titanates provide antioxidant properties and can modify or control cure chemistry.

The use of an interfacial modifier results in workable thermoplastic viscosity and improved structural properties in a final use such as a structural member or shaped article. Minimal amounts of the modifier can be used including about 0.005 to 8 wt.-%, about 0.01 to 6 wt.-%, about 0.02 to 5 wt.-%, or about 0.02 to 3 wt. %. The IM coating can be formed as a coating of at least 3 molecular layers or at least about 50 or about 100 to 500 or about 100 to 1000 or about 100 to 1500 angstroms (Å). The claimed composites with increased loadings of fiber can be safely compounded and melt processed formed into high strength structural members. The interfacial modification technology depends on the ability to isolate the fibers from the continuous polymer phase. The isolation is obtained from a continuous molecular layer(s) of interfacial modifier to be distributed over the blended fibers surfaces. From another perspective, the IM coated fibers are immiscible in the polymer phase. Once this layer is applied, the behavior at the interface of the interfacial modifier coating to polymer dominates and defines the physical properties of the composite and the shaped or structural article (e.g. modulus, tensile, rheology, packing fraction and elongation behavior) while the bulk nature of the fiber dominates the bulk material characteristics of the composite (e.g. density, thermal conductivity, compressive strength). The correlation of fiber bulk properties to that of the final composite is especially strong due to the high-volume percentage loadings of discontinuous phase, such as fiber, associated with the technology.

The fibers are coated with IM to obtain the processing and physical properties needed. Once coated, the fiber exterior appears to be the IM composition to the polymer while the fiber silica or fiber silicate character is hidden. The organic nature of the IM coating changes the nature of the interaction between the fiber surface and the polymer phase. The silicate surfaces of the fibers are of a different surface energy and hydrophobicity than the polymer or coating. The polymer does not easily associate with the inorganic fiber surface, but much more easily associates with the organic nature of the IM coated surfaces of the inorganic fibers. The blended IM coated fiber mixes well with the polymer and can achieve greater composite uniformity and fiber loadings.

The benefit of interfacial modification on a fully coated fiber is independent of overall fiber shape. The current upper limit constraint is associated with challenges of successful dispersion of fibers within laboratory compounding equipment without significantly damaging the high aspect ratio fibers. Furthermore, inherent rheological challenges are associated with high aspect ratio fibers. With proper engineering, the ability to successfully compound and produce interfacially modify fibers of fiber fragments with aspect ratio more than 20 often in excess of 100, 200 or more is provided.

For composites containing high volumetric loading of fibers, the rheological behavior of the highly packed composites depends on the characteristics of the contact points between the fibers and the distance between fibers. When forming composites with polymeric volumes approximately equal to the excluded volume of the discontinuous phase, inter-fiber interaction dominates the behavior of the material. Fibers contact one another and the combination of interacting sharp edges, soft surfaces (resulting in gouging) and the friction between the surfaces prevent further or optimal packing. Interfacial modifying chemistries can alter the surface of the fiber by coordination bonding, Van der Waals forces, or a combination. The surface of the interfacially modified fibers behave as fibers formed of the non-reacted end or non-reacting end of the interfacial modifier. The coating of the interfacial modifier improves fiber surface wetting by the polymer and as a result improves the physical association of the fiber and polymer in the formed composite leading to improved physical properties including, but not limited to, increased tensile and flexural strength, increased tensile and flexural modulus, improved notched IZOD or Gardner impact results and reduced coefficient of thermal expansion. In the melt, the interfacial modified coating on the fiber reduces the friction between fibers thereby preventing gouging and allowing for greater freedom of movement between fibers in contrast to fibers that have not been coated with interfacial modifier chemistry. Thus, the composite can be melt-processed at greater productivity and at conditions of reduced temperature and pressure severity. The process and physical property benefits of utilizing the coated fibers in the acceptable fiber morphology index range does not become evident until packing to a significant proportion of the maximum packing fraction; this value is typically greater than approximately 40, 50, 60, 70, 80, 90, 92 or 95 volume or weight % of the fiber phase in the composite.

In a composite, the fiber is usually much stronger and stiffer than the polymer matrix and gives the composite its designed structural or shaped article properties. The polymer matrix holds the fiber in an orderly high-density pattern. Because the fibers are usually discontinuous, the matrix also helps to transfer load among the non-metal, inorganic, synthetic, natural, or mineral fibers. Processing can aid in the mixing and filling of the non-metal, inorganic or mineral fibers. An interfacial modifier (IM) is an organic material that provides an exterior coating on the fiber promoting the close association of polymer and fiber. Minimal amounts of the interfacial modifier can be used on regular morphology while higher amounts of the IM are used to coat materials with increased or irregular surface morphology. Typically, the coated, blended fiber, polymer composite materials can be manufactured using melt processing and are also utilized in product formation using melt processing such as extrusion, injection molding and the like.

To interfacially modify at a lab scale, the interfacial modifier is first solubilized with a solvent such as IPA. The solvent/modifier mixture is applied to a fiber portion previously placed within a preparation vessel. The solvent/modifier mixture is added in enough volume to fully wet and flood the fiber. The outer part of vessel is then heated to volatize the solvent. After a sufficient time, the modified fiber becomes free flowing—an indication that they are ready for compounding and thermoplastic processing. The extruded or injection molded member can be formed as a linear member or a hollow profile.

The improved process viscosity can be seen in comparing the processing of a composite as claimed compared to a composite of uncoated fiber. The claimed materials have substantially reduced processing viscosity that is derived from the freedom of movement of the interfacially modified fiber within the polymer matrix. IM use also provides some fiber self-ordering which increases fiber packing fraction without the loss of rheology or breakage of fibers. We used a C. W. Brabender Computerized Plasti-Corder test mixer equipped with a 19.1 mm. (¾ in.) diameter extruder with a 25/1 length/diameter ratio. The extrusion screw had ten feed flights, 10 compression flights with a compression ratio of 3:1, and 5 metering flights. Operating parameters were controlled by 5 independent heating zones, four pressure transducers and a torque-measuring drive unit. Software module was used for extrusion data. The capillary die, made from #416 stainless steel, had a diameter of 2 mm and a length of 40 mm. In operation, the operating conditions were set, and the blended fiber polymer composite was then extruded until equilibrium (constant throughput and constant die pressure) were reached. Extrusion at 40 rpm and a die pressure of about 28 Mpa were used. Brabender viscosity is reported as torque according to the appropriate ASTM protocol in N-m. The linear member can be in the form of dimensioned lumber, trim pieces, circular cross-section rod, I-beam, etc. The profile comprises an exterior wall or shell substantially enclosing a hollow interior. The interior can contain structural web providing support for the walls and can contain one fastener anchor.

The composite, thus, obtains improved physical properties such as notched IZOD impact strength (ft-lb-in$^{-1}$) (ASTM D256), tensile strength (lb-in$^2$), modulus (lb.×10$^6$-in$^{-2}$) and elongation (%) (ASTM D638/D3039) flexural strength (lb-in$^2$) and modulus (lb.×10$^6$-in$^{-2}$) at elevated temperature (ASTM 790), and coefficient of thermal expansion (in-in$^{-1}$-° C.) (COTE-ASTM 696). Such properties are seen over a range of environmental temperatures.

A large variety of thermoplastic polymer and copolymer materials can be used in the composite materials. We have found that polymer materials useful in the composite include both condensation polymeric materials and addition or vinyl polymeric materials.

Vinyl polymers are typically manufactured by the polymerization of monomers having an ethylenically unsaturated olefinic group. Condensation polymers are typically prepared by a condensation polymerization reaction which is typically considered to be a stepwise chemical reaction in which two or more molecules combined, often but not necessarily accompanied by the separation of water, methanol or some other simple, typically volatile substance. Such polymers can be formed in a process called polycondensation. The typical polymer has density of at least 0.85 gm-cm$^{-3}$, however, polymers having a density of greater than 0.96 are useful to enhance overall product density. A density is often 0.85 to 1.7 or up to 2 gm-cm$^{-3}$ or can be about 0.96 to 1.95 gm-cm$^{-3}$.

Vinyl polymers include polyacrylonitrile; polymer of alpha-olefins such as ethylene, propylene, etc.; polymers of chlorinated monomers such as vinyl chloride, vinylidene chloride, acrylate monomers such as acrylic acid, methyl acrylate, methyl methacrylate, acrylamide, hydroxyethyl acrylate, and others; styrenic monomers such as styrene, alpha-methyl styrene, vinyl toluene, etc.; vinyl acetate; and other commonly available ethylenically unsaturated monomer compositions. Examples include polyethylene, polypropylene, polybutylene, acrylonitrile-butadiene-styrene (ABS), polybutylene copolymers, polyacetal resins, polyacrylic resins, homopolymers, etc. Useful polymers are halogen polymers such as homopolymers, copolymers, and blends comprising vinyl chloride, vinylidene chloride, fluorocarbon monomers, etc. Polyvinyl chloride polymers with a K value of 50-75 can be used. A characteristic of the PVC resin is the length or size of the polymer molecules. A measure of the length or size is molecular weight of PVC. A useful molecular weight can be based on measurements of viscosity of a PVC solution. Such a K value ranges usually between 35 and 80. Low K-values imply low molecular weight (which is easy to process but has properties consistent with lower polymer size) and high K-values imply high molecular weight, (which is difficult to process, but has properties consistent with polymer size). The most commonly employed molecular characterization of PVC is to measure the one-point-solution viscosity. Expressed either as inherent viscosity (IV) or K-value, this measurement is used to select resins for the use in extrusion, molding, as well as for sheets, films or other applications. The inherent viscosity (IV) or K-value is the industry standard (ISO 1628-2) starting point for designing compounds for end use. Polymer solution viscosity is the most common measurement for further calculation of inherent viscosity or the K-value, because it is an inexpensive and routine procedure that can be used in manufacturing as well as in R&D labs. For example, a Lovis® 2000 M/ME micro-viscometer can measure polymer solution viscosity and set K value. A useful PVC is a blend of PVC homopolymer and 1-3 wt. % stabilizers, 1-4 wt. 5 process aids, 1-3 wt. % metal release aids, 1-5 wt. % internal and external lubricants, and up to 15 wt. % inorganic fillers.

Condensation polymers include nylon, phenoxy resins, polyarylether such as polyphenylether, polyphenylsulfide materials; polycarbonate materials, chlorinated polyether resins, polyethersulfone resins, polyphenylene oxide resins, polysulfone resins, polyimide resins, thermoplastic urethane elastomers and many other resin materials. Condensation polymers that can be used in the composite materials include polyamides, polyamide-imide polymers, polyarylsulfones, polycarbonate, polybutylene terephthalate, polybutylene naphtholates, polyetherimides, polyether sulfones, polyethylene terephthalate, thermoplastic polyamides, polyphenylene ether blends, polyphenylene sulfide, polysulfones, thermoplastic polyurethanes and others. Preferred condensation engineering polymers include polycarbonate materials, polyphenyleneoxide materials, and polyester materials including polyethylene terephthalate, polybutylene terephthalate, polyethylene naphthalate and polybutylene naphthalate materials.

Polymer blends or polymer alloys can be useful in manufacturing the claimed pellet or linear extrudate. Such alloys typically comprise two miscible polymers blended to form a uniform composition. Scientific and commercial progress in the area of polymer blends has led to the realization that important physical property improvements can be made not by developing new polymer material but by forming miscible polymer blends or alloys. A polymer alloy at equilibrium comprises a mixture of two amorphous polymers existing as a single phase of intimately mixed segments of the two macro molecular components. Miscible amorphous polymers form glasses upon enough cooling and a homogeneous or miscible polymer blend exhibits a single, composition dependent glass transition temperature ($T_g$). Immiscible or non-alloyed blend of polymers typically displays two or more glass transition temperatures associated with immiscible polymer phases. In the simplest cases, the properties of polymer alloys reflect a composition-weighted average of properties possessed by the components. In general, however, the property dependence on composition varies in a complex way with a particular property, the nature of the components (glassy, rubbery or semi-crystalline), the thermodynamic state of the blend, and its mechanical state whether molecules and phases are oriented.

The primary requirement for the substantially thermoplastic engineering polymer material is that it retains sufficient thermoplastic properties such as viscosity and stability, to permit melt blending with a fiber, permit formation of linear extrudate pellets, and to permit the composition material or pellet to be extruded or injection molded in a conventional thermoplastic process forming the useful product. Engineering polymer and polymer alloys are available from a number of manufacturers including Dyneon LLC, B.F. Goodrich, G.E., Dow, and duPont.

There are two key attributes of the surface coating that dictate the ability to be successfully interfacially modified: 1) the overall surface area of fiber; and 2) fiber surface characteristics that are on the order of the molecular size of the interfacial modifier being applied.

Sizing materials used as glass coatings do not act as interfacial modifiers. Sizing is an essential in glass fiber manufacture and critical to certain glass fiber characteristics determining how fibers will be handled during manufacturing and use. Raw fibers are abrasive and easily abraded and reduced in size. Without sizing, fibers can be reduced to useless "fuzz" during processing. Sizing formulations have been used by manufacturers to distinguish their glass products from competitors' glass products. Glass fiber sizing, typically, is a mixture of several chemistries each contributing to sizing performance on the glass fiber surface. Sizings typically are manufactured from film forming compositions and reactive coupling agents. Once formed, the combination of a film forming material and a reactive coupler forms a reactively coupled film that is, reactively coupled to the glass fiber surface. The sizing protects the fiber, holding fibers together prior to molding but promote dispersion of the fiber when coming into contact with polymer or resin insuring wet out of glass fiber with resin during composite manufacture. Typically, the coupling agent used with the film forming agent, is a reactive alkoxy silane compound serving primarily to bond the glass fiber to their matrix or film forming resin. Silane typically have a silicon containing group and that bonds well to glass (typically SiO$_2$) with a reactive organic end that bonds well to film forming polymer resins. Sizings also may contain additional lubricating agents as well as anti-static agents. We have used sized fibers in our studies and found that sizing does not act as interfacial modifier and we can coat all sizing that we have found. While a sizing often contains coupling agents, an IM is free of coupling or reactive coupling agents.

Typically, the composite materials can be manufactured using melt processing and are also utilized in product formation using melt processing. A typical thermoplastic polymer material is combined with IM coated blended fiber and processed until the material attains (e.g.) a uniform density (if density is the characteristic used as a determinant). Alternatively, in the manufacture of the material, the fiber or the thermoplastic polymer may be blended with interfacial modification agents and the modified materials can then be melt processed into the material. Once the material attains a sufficient property, such as, for example, density, the material can be extruded into a product or into a raw material in the form of a pellet, chip, wafer, preform or other easily processed material using conventional processing techniques.

In the manufacture of useful products, the manufactured composite can be obtained in appropriate amounts, subjected to heat and pressure, typically in an extruder, or in additive manufacturing useful for 3D printing (additive manufacturing), or injection molding equipment and then formed into an appropriate shape having the correct amount of materials in the appropriate physical configuration.

In the appropriate product design, during composite manufacture or during product or article manufacture, a pigment or other dye material can be added to the processing equipment. One advantage of this material is that an inorganic dye or pigment can be co-processed resulting in a material that needs no exterior painting or coating to obtain an attractive, functional, or decorative appearance. The pigments can be included in the polymer blend, can be uniformly distributed throughout the material and can result in a surface that cannot chip, scar or lose its decorative appearance. One particularly important pigment material comprises titanium dioxide (TiO$_2$). This material is non-toxic, is a bright white particulate that can be easily combined with the fiber and/or polymer composites to enhance the novel characteristics of the composite material and to provide a white hue to the ultimate composite material.

The manufacture of the composite materials depends on good melt processing manufacturing technique. The fiber is initially treated with an interfacial modifier by contacting the fiber with the modifier directly or in the form of a solution of interfacial modifier on the fiber surface with blending and drying carefully to ensure uniform fiber coating. Interfacial modifier can also be added to fibers in bulk blending operations using high intensity Littleford or Henschel blenders. Alternatively, addition of the fiber blend to the twin cone mixers can be followed by drying or direct addition to a screw compounding device. Interfacial modifiers may also be combined with the fiber blend in aprotic solvent such as toluene, tetrahydrofuran, mineral spirits or other such known solvents.

The fiber blend can be combined into the polymer phase depending on the nature of the polymer phase, the filler, the fiber surface chemistry and any pigment process aid or additive present in the composite material. The composite materials having the desired physical properties can be manufactured as follows. In an embodiment, the surface of the fiber is initially prepared, the interfacial modifier coats the fiber, and the resulting IM coated blended fiber product is isolated and then combined with the continuous polymer phase to affect an immiscible dispersion or association between the fiber and the polymer. Once the composite material is compounded or prepared, it is then melt-processed into the desired shape of the end use article.

Solution processing is an alternative that provides solvent recovery during materials processing. The materials can also be dry blended without solvent. Blending systems such as ribbon blenders obtained from Drais Systems, high-density drive blenders available from Littleford Brothers and Henschel are possible. Further melt blending using Banberry, other single screw or twin-screw compounders is also useful. When the materials are processed as a plastisol or organosol with solvent, liquid ingredients are generally charged to a processing unit first, followed by polymer, fiber and rapid agitation. Once all materials are added a vacuum can be applied to remove residual air and solvent, and mixing is continued until the product is uniform and high in density.

Dry blending is generally preferred due to advantages in cost. However certain embodiments can be compositionally unstable due to differences in fiber size. In dry blending processes, the composite can be made by first introducing the polymer, combining the polymer stabilizers, if necessary, at a temperature from about ambient to about 60° C. with the polymer, blending an IM coated blended fiber with the stabilized polymer, blending other process aids, interfacial modifier, colorants, indicators or lubricants followed by mixing in hot mix, transfer to storage, packaging or end use manufacture. Fiber materials can be obtained or produced on site. Interfacially modified materials can be made with solvent techniques that use an effective amount of solvent to initiate formation of a composite.

Interfacially modified materials can be made with solvent techniques that use an effective amount of solvent to initiate formation of a coating. When interfacially modification is substantially complete, the solvent can be stripped. Such solvent processes are conducted by solvating the interfacial modifier or polymer or both; mixing CaSiO$_3$ fiber and other fiber with interfacial modifier into a bulk phase or polymer master batch and devolatilizing the composition in the presence of heat & vacuum above the Tg of the polymer.

The composite can be used to make a pellet. Such a pellet made of the composite can be used as an intermediate between the compounding of the composite and the manufacturing of the final product. Such a pellet can comprise the composite comprising the components in use concentration of components designed to be directly converted or used in making a useful article. Alternatively, the pellet can comprise a master batch composition with increased amounts, e.g., about 2 to 10 times the amount of fiber such that the pellet can be combined with polymer in proportions that result in producing use concentrations. The pellet is a roughly cylindrical object that can be fed into an extruder input. The pellet is typically 1 to 50, 1 to 60, 1 to 70, 1 to 80, 1 to 90, or 1 to 100 mm in height and 1 to 5, 1 to 10, 1 to 15, or 1 to 20 mm in diameter. A pellet weighs about 10 to 100 mg, 10 to 80 mg, 10 to 70 mg, 10 to 60 mg, 10 to 50 mg, 20 to 50 mg, 20 to 60 mg, 20 to 70 mg, 20 to 80 mg.

The composite can be used to make an article of manufacture. Such articles can be made directly from the compounding process or can be made from a pellet input. Articles can include pellets used in further melt-processing, structural members, or other articles that can be made using thermoplastic processing such as injection molding, compression molding, etc.

Structural members include linear extrudates that can be mechanically milled or reinforced with secondary members. The articles can be used in a fenestration unit as a frame member, muntin, grill etc. The articles can be used in a decking installation as a decking member, a trim, or a support. The article can be used as a rail, baluster or post. The article can be used as a siding member.

The interior of the structural member is commonly provided with one or more structural webs which in a direction of applied stress supports the structure. Structural web typically comprises a wall, post, support member, or other formed structural element which increases compressive strength, torsion strength, or other structural or mechanical properties. Such structural web connects the adjacent or opposing surfaces of the interior of the structural member. More than one structural web can be placed to carry stress from surface to surface at the locations of the application of stress to protect the structural member from crushing, torsional failure or general breakage. Typically, such support webs are extruded, or injection molded during the manufacture of the structural material. However, a support can be post added from parts made during separate manufacturing operations.

The internal space of the structural member can also contain a fastener anchor or fastener installation support. Such an anchor or support means provides a locus for the introduction of a screw, nail, bolt or other fastener used in either assembling the unit or anchoring the unit to a rough opening in the commercial or residential structure. The anchor web typically is conformed to adapt itself to the geometry of the anchor and can simply comprise an angular opening in a formed composite structure, can comprise opposing surfaces having a gap or valley approximately equal to the screw thickness, can be geometrically formed to match a key or other lock mechanism, or can take the form of any commonly available automatic fastener means available to the window manufacturer from fastener or anchor parts manufactured by companies such as Amerock Corp., Illinois Tool Works and others.

The structural member can have extrusion molded, premolded paths or paths machined into the molded thermoplastic composite for passage of door or window units, fasteners such as screws, nails, etc. Such paths can be counter sunk, metal lined, or otherwise adapted to the geometry or the composition of the fastener materials. The structural member can have mating surfaces formed to provide rapid assembly with other window components. Components of similar or different compositions having similarly adapted mating surfaces. Further, the structural member can have mating surfaces formed in the shell of the structural member adapted to moveable window sash or door sash or other moveable parts used in window operations.

The structural member can have a mating surface adapted for the attachment of the subfloor or base, framing studs or side molding or beam, top portion of the structural member to the rough opening. Such a mating surface can be flat or can have a geometry designed to permit easy installation, sufficient support and attachment to the rough opening. The structural member shell can have other surfaces adapted to an exterior trim and interior mating with wood trim pieces and other surfaces formed into the exposed sides of the structural member adapted to the installation of metal runners, wood trim parts, door runner supports, or other metal, plastic, or wood members commonly used in the assembly of windows and doors.

The assembly can use known fastener techniques. Such techniques include screws, nails, and other hardware. The structural members can also be joined by an insert into the hollow profile, glue, or a melt fusing technique wherein a fused weld is formed at a joint between two structural members. The structural members can be cut or milled to form conventional mating surfaces including 90° angle joints, rabbit joints, tongue and groove joints, butt joints, etc. Such joints can be bonded using an insert placed into the hollow profile that is hidden when joinery is complete. Such an insert can be glued or thermally welded into place. The insert can be injection molded or formed from similar thermoplastics and can have a service adapted for compression fitting and secure attachment to the structural member. Such an insert can project from approximately 1 to 5 inches into the hollow interior of the structural member. The insert can be shaped to form a 90° angle, a 180° extension, or other acute or obtuse angle required in the assembly of the structural member.

Further, such members can be manufactured by milling the mating faces and gluing members together with a solvent, structural or hot melt adhesive. Solvent borne adhesives that can act to dissolve or soften thermoplastic present in the structural member and to promote solvent based adhesion or welding of the materials are known in polyvinyl chloride technology. In the welding technique, once the joint surfaces are formed, the surfaces of the joint can be heated to a temperature above the melting point of the composite material and while hot, the mating surfaces can be contacted in a configuration required in the assembled structure. The contacted heated surfaces fuse through an intimate mixing of molten thermoplastic from each surface. Once mixed, the materials cool to form a structural joint having strength typically greater than joinery made with conventional techniques. Any excess thermoplastic melt that is forced from the joint area by pressure in assembling the surfaces can be removed using a heated surface, mechanical routing or a precision knife cutter.

TABLE 1

Exemplary Composites

| Component | Useful amounts | Useful amounts | Useful amounts |
| --- | --- | --- | --- |
| Glass fiber (vol. %) | 5-95 | 10-90 | 15-85 |
| Silicate fiber (vol. %) | 5-60 | 8-50 | 10-45 |
| Glass fiber (wt. %) | 5-95 | 10-90 | 15-85 |
| Silicate fiber (wt. %) | 10-75 | 15-70 | 20-65 |
| Interfacial modifier coating (Vol. %) | 0.1-5 | 0.3-3 | 0.5-2.5 |
| Interfacial modifier coating (Wt. %) | 0.1-2 | 0.2-1 | 0.3-0.8 |
| Thermoplastic polymer (vol. %) | 45-95 | 50-92 | 55-90 |
| Thermoplastic polymer (wt. %) | 20-90 | 30-85 | 35-80 |

With an IM, the composites can achieve the following properties:

TABLE 2

Typical property ranges

| Property | ASTM Method | Minimum Value | Range of Value | Units |
|---|---|---|---|---|
| Tensile Strength | D638 | 35 ($5 \times 10^4$) | >35 | MPa (psi) |
| Tensile Modulus | D638 | 8 ($1.2 \times 10^6$) | >4 | GPa (psi) |
| Flexural Strength | D790 | 35 ($5 \times 10^4$) | >35 | MPa (psi) |
| Flexural Modulus | D790 | 8 ($1.2 \times 10^6$) | >4 | GPa (psi) |
| Notched IZOD | D256 | 70 (1.3) | >30 | $J \cdot m^{-1}$ ($ft \cdot lbs \cdot in^{-1}$) |
| COTE | D696 | Maximum Value: $1.9 \times 10^{-5}$ ($1.1 \times 10^{-5}$) | $<5.4 \times 10^{-5}$ | $cm \cdot cm^{-10} \cdot °C.$ ($in \cdot in^{-1} \cdot °F.$) |

Additionally, the use of the IM permits an increase in the fiber loading in the composite. As the fiber content increases, the polymer content decreases. The thermal expansion of a structural member made with the disclosed material will be improved as fiber content increases, e.g., the material will have reduced coefficient of thermal expansion (COTE).

Experimental Section

In a 70-mm compounder, a pellet was extruded at 168-171° C. using conventional compounding rates and then extruded into test piece(s) for physical testing as shown below using the proportions as follows and in Table 3:

Examples 1-10

Figure 2:
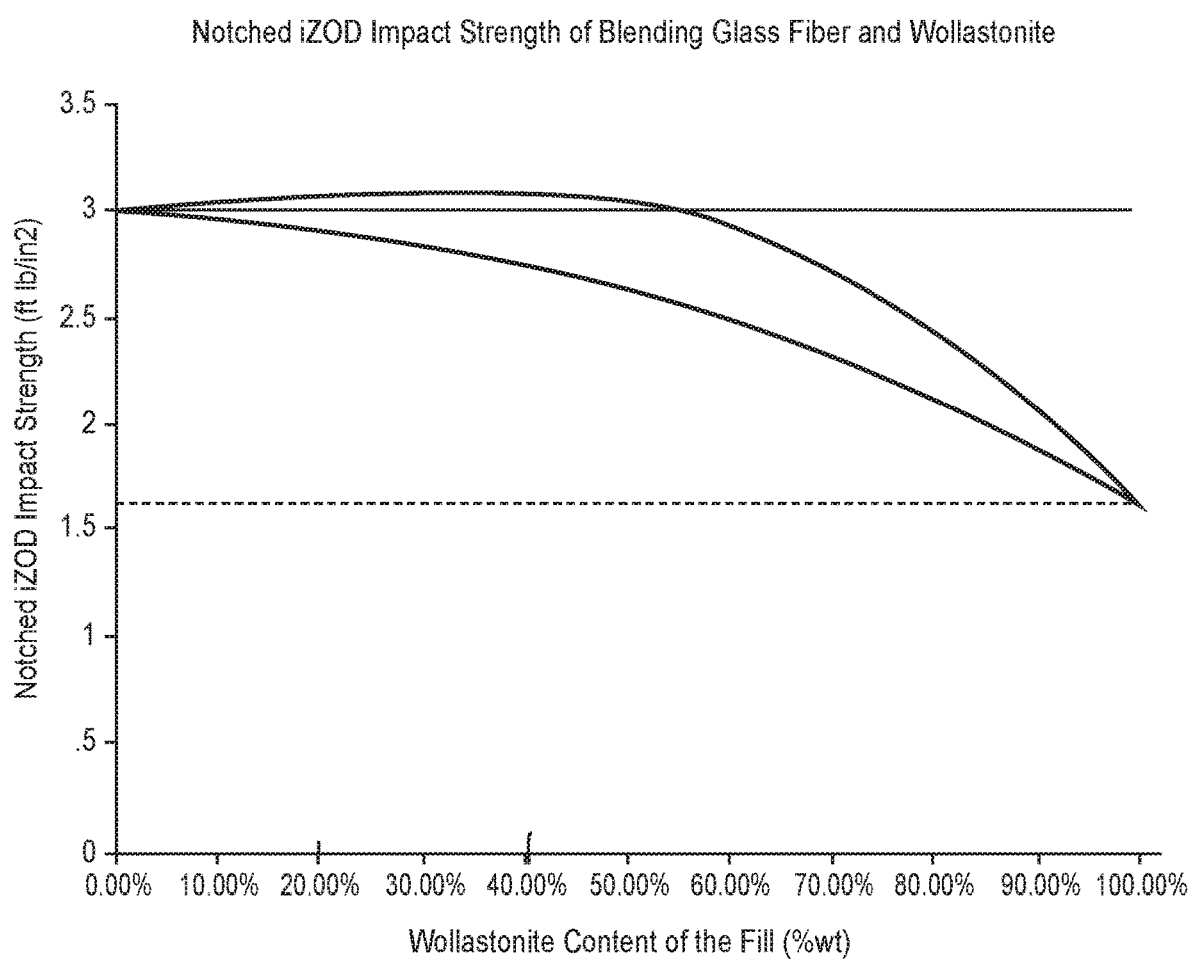

A series of formulations of Polyvinyl chloride homopolymer, Formolon® AWS16 (Formosa, Livingston, N.J.) was combined with an IM coated fiber (1.5 vol. %, 1.5 wt. %, organotitanate) comprising amounts of a glass fiber (Johns Manville, Starstran 718) length 3.175 mm and diameter 13 μm and a wollastonite fiber (Vansil HR2000), length 65 μm and diameter 7 μm in an amount of 30 vol. % (46 wt. %) and compounded into a pellet with dimensions of approximate length of 3 mm and approximate diameter of 5 mm. The range of materials tested and test results for flex and notched IZOD impact strength are shown in FIGS. 1 and 2.

Detailed Discussion of the Figures

These data (FIGS. 1 and 2) show that at an amount of about 5 to 55 wt. % wollastonite, the composite is equal to or exceeds a composite of glass in flex and notched IZOD impact strength. At amounts of wollastonite of 55 to 80 wt. %, the composite possesses sufficient physical integrity to satisfy the needs of a manufacture of construction units such as fenestration, siding and decking.

Example 13 Master Batch

Polyvinyl chloride homopolymer (PVC), Formolon ASW16 (Formosa, Livingston, N.J.) was combined with an IM coated fiber (organo titanate, 1 wt. %) wollastonite fiber, (Vansil VG) to form a concentrate Master batch. This was compounded into a pellet with dimensions of approximate length of 3 mm and approximate diameter of 5 mm.

Example 11

The master batch was combined with PVC to form a test piece containing 4 vol. % (7 wt. %) wollastonite for tensile testing.

Example 12

The master batch was combined with PVC to form a test piece containing 23 vol. % (37 wt. %) wollastonite for physical properties testing.

Compounder Configuration:

| Barrel Temperature | 191 | ° C. |
|---|---|---|
| rate | 6-7 | RPM |
| Throughput | 1500 | $ft \cdot min^{-1}$ |
| Die | Pellet die | |
| Pelletizer speed | 700 | RPM |
| Vacuum | 20 | In—Hg |

The compounded pellets were extruded into test strips on a 1" diameter extruder. Extruded strips were cut to length and tested for tensile properties (ASTM D638), Izod impact (ASTM D256), heat deflection temperature (HDT) (ASTM D648), and coefficient of thermal expansion (ASTM D696).

TABLE 3

| Compositions | | | |
|---|---|---|---|
| Material Example No. | Wt. % Wollastonite Fiber | Vol. % Wollastonite Fiber | $g \cdot cm^{-3}$ |
| 11 | 7% | 4% | 1.48 |
| 12 | 37% | 23% | 1.76 |
| 13 | 70% | 53% | 2.22 |

TABLE 4

Physical testing results

| Material Example No. | Tensile Testing | | Flex Testing | | IZOD Impact Strength | Thermal Properties | |
|---|---|---|---|---|---|---|---|
| | Max Tensile Strength | Tensile Modulus | Max Flexural Strength | Flexural Modulus Parameter | Notched Impact Strength | COTE | HDT (264 PSI) |
| | psi | Mpsi | psi | Mpsi | ft-lbf-in$^{-2}$ | in/in ° C. | ° C. |
| | ASTM# D638 | D638 | D790 | D790 | D256 | D696 | D648 |
| 11 | 4796 | 0.50 | 8532 | 0.42 | 1.5 | 4.97E–05 | 66.4 |
| 12 | 4011 | 1.17 | 8256 | 1.35 | 2.4 | 2.44E–05 | 68.6 |
| 13 | 2600 | 2.12 | 4800 | 2.49 | 1.67 | 4.00–06 | 65.9 |

Example 14a

Polyvinyl chloride homopolymer, Formolon® AWS16 (Formosa, Livingston, N.J.) in an amount of 69 vol. % (53 wt. %) was combined with an IM coated fiber (organo titanate, 0.88 vol. %, 0.46 wt. %) wollastonite fiber, length 65 μm and diameter 7 μm (HR2000, Vansil) in an amount of 30 vol. % (46 wt. %) and compounded into a pellet with dimensions of approximate length of 3 mm and approximate diameter of 5 mm. Comparative examples were made with glass fiber components.

Example 14

Polyvinyl chloride homopolymer, Formolon® AWS16 (Formosa, Livingston, N.J.) in an amount of 58 vol. % (44 wt. %) combined with an IM coated fiber (organotitanate, 1.69 vol. %, 0.83 wt. %), glass fiber (John Mansville, Starstran 718) in an amount of 41 vol. % (55 wt. %) and compounded into a pellet with dimensions of approximate length of 3 mm and approximate diameter of 5 mm.

The Example and the comparative examples were tested using the appropriate test piece as follows in Table 5.

TABLE 5 testing results

| Property | Example 14a | Ex. 14 |
|---|---|---|
| Density (g-cc$^{-1}$) | 1.87 | 1.87 |
| Tensile strength (psi) | 3383 | 9000 |
| Tensile modulus (Mpsi) | 1.24 | 2.06 |
| Tensile elongation (%) | 1.4 | 1.0 |
| Flex strength (psi) | 7726 | 16900 |
| Flex modulus (Mpsi) | 1.33 | 2.48 |
| Heat distortion temp. (° C.) | 69 | 75 |
| COTE (in · in$^{-1}$ · ° F.) | 1.4 × 10$^{-5}$ | 4.6 × 10$^{-6}$ |
| Notched IZOD impact strength (ft. · lb.-in$^{-2}$) | 1.6 | 3.0 |
| Un-notched IZOD impact strength (ft. · lb.-in$^{-2}$) | 13 | |
| Supported drop dart energy (J) at height (in) | 14 (11) | 18 |
| Unsupported drop dart energy (J) | 9.4 (11) | |

The range of materials tested and test results for flex and notched IZOD impact strength are shown in FIGS. 1 and 2. The combination of fibers with up to 50% wollastonite shows improved flex and impact.

Examples 14-16

Wollastonite was first coated with an organo titanate interfacial modifier using a coater process. The coated wollastonite was then compounded into a composite with PVC (either PolyOne®, Fiberloc® or Formosa® AWS160 on a 26 mm compounder. A first range of comparative materials (repeat of Ex. 11-13) were made containing PVC and wollastonite. A second range of similar materials (Ex. 14-16) were made with wollastonite combined with wood fiber. Compounded pellets were made of the materials.

TABLE 6

| Compounder configuration: | |
|---|---|
| Barrel Temperature | 170-190 ° C. |
| Screw Speed | 112 RPM |
| Throughput | 38 lb-hr$^{-1}$ |
| Die | Pellet die |
| | 6-hole × 3 mm |
| Pelletizer speed | 700 RPM |
| Vacuum | 20 In—Hg |

The compounded pellets were extruded into test strips on a 1" diameter extruder under the following configuration:

TABLE 7

| Extruder configuration: | | |
|---|---|---|
| Screw Design | Standard auger (1:1 compression ratio) | |
| Screw Speed | 25 | RPM |
| Barrel Temperature | 180-190 | ° C. |
| Die Temperature | 205 | ° C. |

Extruded strips were cut to length and tested for tensile properties (ASTM D638), Izod impact (ASTM D256), heat deflection temperature (HDT) (ASTM D648), and coefficient of thermal expansion (ASTM D696).

TABLE 8

Examples 14-16 - Compared to Examples 11-13

| Material Example no. | Pine fiber | Wt. % wollastonite Fiber | Vol. % wollastonite Fiber | Wt. % Pine Fiber | vol % Pine Fiber | Wt. % solids | Vol. % solids | g/cc |
|---|---|---|---|---|---|---|---|---|
| 11 | None | 7% | 4% | 0% | 0% | 7% | 4% | 1.48 |
| 12 | None | 37% | 23% | 0% | 0% | 37% | 23% | 1.76 |
| 13 | None | 70% | 53% | 0% | 0% | 70% | 54% | 2.22 |
| 14 | Pine Fiber | 30% | 17% | 10% | 11% | 40% | 30% | 1.66 |
| 15 | Pine Fiber | 10% | 5% | 30% | 30% | 40% | 38% | 1.48 |
| 16 | Pine Fiber | 45% | 28% | 15% | 18% | 60% | 49% | 1.83 |

TABLE 9

Test results

| | Tensile Testing | | Flex Testing | | IZOD Impact Strength Test | Thermal Properties | |
|---|---|---|---|---|---|---|---|
| | Max Tensile Strength | Tensile Modulus | Max Flexural Strength | Flexural Modulus Parameter | Notched Impact Strength | COTE | Heat Deflection Temperature (264 PSI) |
| Material Example | psi | Mpsi | psi | Mpsi | ft-lbf-in$^{-2}$ | in/in $°$ C. | $°$ C. |
| | | | | ASTM # | | | |
| No. | D638 | D638 | D790 | D790 | D256 | D696 | D648 |
| | 4796 | 0.50 | 8532 | 0.42 | 1.5 | 4.97E−05 | 66.4 |
| 11 | 4011 | 1.17 | 8256 | 1.35 | 2.4 | 2.44E−05 | 68.6 |
| 12 | 2600 | 2.12 | 4800 | 2.49 | 1.6 | 4.00E−06 | 65.9 |
| 13 | 3884 | 1.12 | 7719 | 1.13 | 3.2 | 2.24E−05 | 70.8 |
| 14 | 3503 | 0.80 | 6579 | 0.75 | 2.8 | 2.38E−05 | 71.3 |
| 15 | 2906 | 1.48 | 5133 | 1.02 | 2.3 | 1.90E−05 | 72.6 |

These data support the conclusion that the interfacial modifier can improve the compatibility of an array of materials in the composite. These data support the conclusion that the wollastonite composite materials have excellent physical properties including tensile strength, tensile elongation, tensile modulus, notched Izod impact resistance, heat deflection temperature, and coefficient of thermal expansion. These materials show a cooperation with the glass bead and fiber and with organic fiber in improving engineering properties in structural members. These data show that wollastonite and fiber improves the tensile, impact and heat resistance properties of PVC.

Detailed Discussion of the Figures

These data (FIGS. 1 and 2) show that at an amount of about 5 to 55 vol. % or 20-40 wt. % IM coated wollastonite fibers with IM coated glass fibers, the composite is equal to or exceeds a composite of glass in flex and notched IZOD impact strength. With these amounts of wollastonite, the composite possesses enough physical integrity to satisfy the needs of a manufacture of construction units such as fenestration, siding and decking.

The claims may suitably comprise, consist of, or consist essentially of, or be substantially free or free of any of the disclosed or recited elements. The claimed technology is illustratively disclosed herein can also be suitably practiced in the absence of any element which is not specifically disclosed herein. The various embodiments described above are provided by way of illustration only and should not be construed to limit the claims attached hereto. Various modifications and changes may be made without following the example embodiments and applications illustrated and described herein, and without departing from the true spirit and scope of the following claims.

While the above specification shows an enabling disclosure of the composite technology, other embodiments may be made with the claimed materials. Accordingly, the invention is embodied solely in the claims hereinafter appended.

We claim:

1. A thermoplastic composite comprising about 90 to 10 vol. % of a discontinuous fiber phase dispersed in about 10 to 90 vol. % of a continuous polymer phase:
   (a) the discontinuous phase comprising a mixed fiber comprising up to 95 wt. %, the mixed fiber comprising about 8 to 50 wt. % of a CaSiO$_3$ fiber, and about 45 to 87 wt. % of a silica fiber having a length greater than about 1 mm, a diameter greater than about 0.8 microns and an aspect ratio greater than about 100, the CaSiO$_3$ fiber having a length greater than about 10 microns, a diameter greater than about 3 microns and an aspect ratio greater than about 12:1, the 10 mixed fibers having about 0.1 to 5 wt. % of an exterior coating comprising an organometallic interfacial modifier, the wt. % based on the discontinuous phase; and (b) the continuous polymer phase comprising a vinyl chloride polymer;

wherein the composite has a notched IZOD impact resistance of about 0.4 to 3.0 ft-lb-in·1 (ASTM D256), a COTE of about less than 2×10·5 in·in$^{-1°}$ F. (ASTM 696), a tensile modulus 15 (ASTM D638) of greater than 700,000 psi at 72° F., a flexural modulus (ASTM D790) of greater than 700,000 psi at 72° F., a flexural strength (ASTM D790) of greater than 2,500 psi at 72° F., a tensile strength (ASTM D638) of greater than 2,000 psi at 72° F.

2. The composite of claim 1 wherein the CaSiO$_3$ fiber comprises a wollastonite fiber.

3. The composite of claim 1 comprising about 15 to 50 vol. % of the silica fiber comprising a discontinuous glass fiber phase and about 50 to 85 vol. % continuous polymer phase.

4. The composite of claim 1 wherein the polymer comprises a polyvinylchloride homopolymer.

5. The composite of claim 1 wherein the polymer K value is about 35-80 (ISO 1628-2).

6. The composite of claim 1 comprising about 0.1 to 3 wt.-% of an interfacial modifier.

7. The composite of claim 1 wherein the organometallic interfacial modifier comprises a titanate compound.

8. The composite of claim 1 wherein the exterior coating comprises a continuous layer having a thickness of about 100 to 1500 Å.

9. The composite of claim 1 wherein the organometallic interfacial modifier is free of any reactive coupling agent.

10. The composite of claim 1 wherein the wherein the composite is free of any epoxy or silane reactive coupling agent.

11. The composite of claim 1 wherein the silicate fiber comprises wollastonite fiber with a fiber having a length about 50-250 microns, a diameter about 5-20 microns and an aspect ratio greater than about 15, the fiber having about 0.1 to 5 wt. % of an exterior coating comprising an organotitanate interfacial modifier.

12. The composite of claim 1 wherein the silica fiber comprises glass having a length about 20 0.1 to 20 mm, a diameter about 5 to 20 microns and an aspect ratio greater than about 100.

13. A pellet comprising a cylindrical object with a diameter of about 1 to 20 mm and a length of about 1 to 50 mm comprising the composition of claim 1.

14. A master batch pellet comprising a cylindrical object with a about 1 to 20 mm and a length of about 1 to 50 mm comprising an increased amount of the discontinuous fiber phase such that the masterbatch pellet can be combined with a vinyl chloride polymer at a ratio of about 10 to 2 parts by weight of polymer per part by weight of pellet to form the composition of claim 1.

15. A masterbatch pellet comprising a cylindrical object with a about 1 to 20 mm and a length of about 1 to 50 mm comprising an increased amount of the discontinuous fiber phase such that the masterbatch pellet can be combined with a vinyl chloride polymer at a ratio of about 5 to 2 parts by weight of polymer per part by weight of pellet to form the composition of claim 1.

16. A thermoplastic composite comprising about 50 to 25 vol. % of a discontinuous fiber phase dispersed in about 50 to 75 vol. % of a continuous polymer phase:

(a) the discontinuous phase comprising a mixed fiber comprising up to 95 wt. % of a 10 wood or glass fiber and about 5 to 60 wt. % of a wollastonite fiber, about 40 to 95 wt. % of the wood or glass fiber having a length greater than about 1 mm, a diameter greater than about 0.8 microns and an aspect ratio greater than about 100, the wollastonite fiber having a length about 10-125 microns, a diameter about 5-30 microns and an aspect ratio greater than about 15, the mixed fibers having about 0.1 to 5 wt. % of an exterior coating comprising an organometallic interfacial modifier, the wt. % based on the discontinuous phase; and (b) the continuous polymer phase comprising a vinyl polymer;

wherein the composite has a notched IZOD impact resistance of about 0.5 to 3.0 ft-lb-in·1 (ASTM D256), a COTE of about 2×10·6 to 2×10·5 in·in$^{-1°}$ F. (ASTM 696), a tensile modulus (ASTM D638) of greater than 0.7 to 2.75 Mpsi at 72° F., a flexural modulus (ASTM D790) of 20 greater than 0.7 to 2.7 Mpsi at 72° F., a flexural strength (ASTM D790) of 2.5 to 20 kpsi at 72° F., a tensile strength (ASTM D638) of 2 to 20 kpsi at 72° F.

17. The composite of claim 16 wherein the vinyl polymer comprises a vinyl chloride homopolymer.

18. The composite of claim 16 wherein the exterior coating comprises a continuous layer having a thickness of about 100 to 1500 Å.

19. A shaped article comprising the composite of claim 16 that can be extruded and reextruded.

20. The shaped article of claim 19 wherein the article is a linear extrudate.

21. The article of claim 20 wherein the article is a fenestration unit, siding member, decking member, railing member, trim member.

* * * * *